United States Patent [19]

Stangroom

[11] 4,342,334
[45] Aug. 3, 1982

[54] HYDRAULIC SERVO VALVE

[75] Inventor: James E. Stangroom, Castleton, England

[73] Assignee: The Secretary of State for Defence in Her Britannic Majesty's Government of the United Kingdom of Great Britain and Northern Ireland, London, England

[21] Appl. No.: 143,147

[22] Filed: Apr. 23, 1980

[30] Foreign Application Priority Data

May 15, 1979 [GB] United Kingdom ............... 7916838

[51] Int. Cl.³ .............................................. F16K 11/07
[52] U.S. Cl. .................................. 137/625.48; 91/459; 137/596.16; 137/625.64; 137/806; 251/30
[58] Field of Search ............... 137/13, 596.16, 625.64, 137/806, 827, 565, 625.48, 835; 91/459; 251/30

[56] References Cited

U.S. PATENT DOCUMENTS 2,605,079  7/1952  Miller et al. ............... 137/625.64
3,302,532  2/1967  Graham ............................ 137/13
4,038,511  7/1977  Yamaga et al. ............... 219/121 P

FOREIGN PATENT DOCUMENTS 1161177  3/1958  France .
1265956  1/1963  France .
1511658  5/1978  United Kingdom .

Primary Examiner—William R. Cline
Attorney, Agent, or Firm—Cushman, Darby & Cushman

[57] ABSTRACT

A hydraulic servo valve suitable for controlling flow of a pressurized fluid in dirty and explosive environments, comprises a control valve actuated by a contamination-free sealed pilot circuit of electroviscous fluid commanded by electroviscous valves requiring minimal electrical power. Fluid is circulated in the pilot circuit by pressure pulses derived from the pressurized fluid by means of a fluidic oscillator and transmitted to the pilot circuit via flexible diaphragms.

5 Claims, 1 Drawing Figure

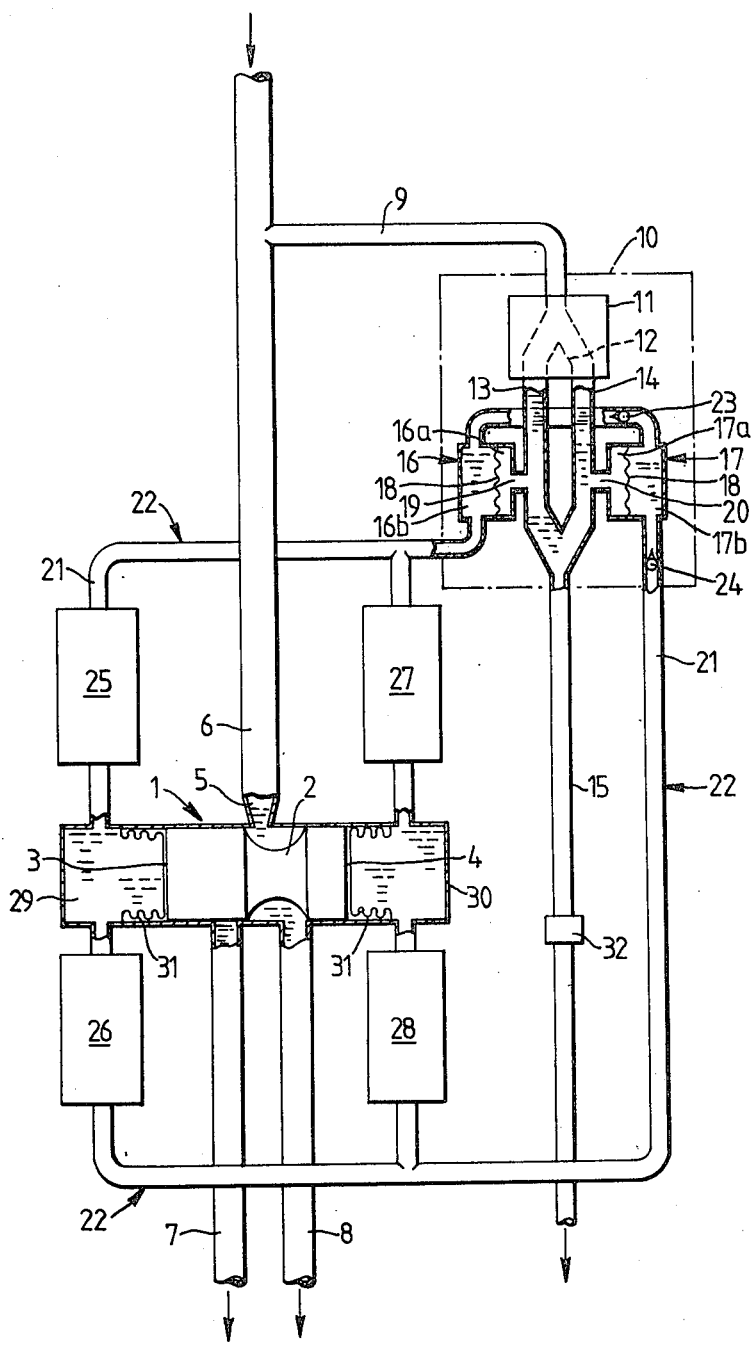

ns of the invention -->
HYDRAULIC SERVO VALVE

BACKGROUND AND SUMMARY OF THE INVENTION

This invention relates to a hydraulic servo valve suitable for use in dirty and explosive environments.

Hydraulic machinery is often called upon to operate in situations in which it is exposed to dust, dirt and explosive atmospheres, a coal mine for example. In machinery for use in coal mines it is found that the working hydraulic fluid is frequently contaminated with dust which tends to jam electrohydraulic servo valves. To overcome this, the electrical actuators of the servo valves are made to be unusually powerful, so that the spool can displace grit in the seatings. However, such powerful electrical actuation requires that relatively high levels of electrical power must be supplied, which may well be sufficient to initiate an explosion in a "fiery" mine, should any failure of insulation occur. For this reason, it is at present necessary to enclose the electro-hydraulic valves of mining equipment in expensive flame-proof enclosures, which are of sufficient thickness to withstand explosion of the atmosphere within.

Electroviscous valves employing electroviscous fluids are known for use in the control of hydraulic servo valves, as described in UK Patent No. 1511658 for example. Electroviscous fluids undergo a change in shear resistance when they are exposed to electric fields, typically of 2 kV over a 1 mm gap, which property is exploited in an elecroviscous valve, the fluid being passed between electrodes to which suitably variable voltages can be applied so as to vary the fluid flow rate through the valve. Although the voltages required are high, the current requirement is very low and the total electrical power demanded would generally be insufficient to initiate an explosion in an explosive atmosphere. For additional safety, a high impedance source can be employed to eliminate explosion risk in the event of a short circuit. In principle therefore, it is possible to make an electroviscous device inherently safe, so that it does not require a flameproof enclosure. However, in an environment in which contamination of working fluids is likely to occur, electroviscous fluid cannot be used as the primary working fluid, nor as a secondary control fluid in an open circuit, as dirt in the fluid would rapidly lead to failure due to arcing at the electroviscous valve electrodes.

The present invention seeks to provide a hydraulic servo valve controlled by means of an entirely enclosed electroviscous fluid circuit requiring relatively little electrical command power.

In accordance with the present invention a hydraulic servo valve having an adjustable control valve for controlling flow of a pressurised primary fluid includes: a sealed pilot circuit of electroviscous fluid having pressure transmitting means for adjusting the control valve and electrically controlled valve means for varying electroviscous fluid pressure at the transmitting means; and a pumping means driveable by the primary fluid for circulating the electroviscous fluid within the sealed pilot circuit.

The control valve may be linearly or rotatably adjustable, linear movement being directly imparted to the valve by the pressure transmitting means and rotary movement being indirectly imparted via suitable torsional elements.

The electrically controlled valve means may comprise a known "Wheatstone Bridge" arrangement of four electroviscous valves disposed as series pairs in two parallel flow paths of the pilot circuit, two flexible-walled chambers comprising the pressure transmitting means, being respectively located intermediate each series pair. In this arrangement, the control valve preferably comprises a spool valve, the spool having two opposing end faces arranged in contact with the two flexible-walled chambers respectively.

The pumping means is preferably isolated from the electroviscous fluid to avoid the possibility of dirt entering the pilot circuit, such as may occur through the sliding seals of conventional in-circuit pumps. A suitable isolated pumping means includes: a fluidic oscillator located in a subsidiary flow line of the primary fluid for directing primary fluid to flow alternately through two parallel outlet flow lines; fluid pressure coupling means for communicating pressure of the primary fluid flowing through each of the two outlet flow lines respectively to the electroviscous fluid in the pilot circuit at two pumping stations thereof; and one-way flow means located in the pilot circuit intermediate the pumping stations.

BRIEF DESCRIPTION OF THE DRAWING

An embodiment of the invention will now be described by way of example only, with reference to the accompanying drawing which is a diagramatic representation of a spool valve controlled by a hydraulically driven electroviscous pilot circuit.

DETAILED DESCRIPTION OF THE PREFERRED EMBODIMENT

A spool valve 1 having a spool 2 and two opposing end faces 3 and 4 is connected to direct a flow of pressurised primary fluid 5 from an inlet line 6 to one or other of two outlet lines 7 and 8. A portion of the primary fluid flow in the line 6 is diverted to flow via a branch flow line 9 to a pumping means 10 which includes a fluidic oscillator 11 having a flow splitter 12 and conventional fluidic control means (not shown) which induce the incoming flow to oscillate between two outlet flow lines 13 and 14. These two outlet lines then re-unite and the fluid is returned via a line 15 to a low pressure return line of the primary hydraulic circuit (not shown).

The pumping means 10 further includes two pumping stations 16 and 17 each comprising two chambers 16a, 16b and 17a, 17b respectively, separated by a flexible diaphragm 18, and chambers 16a and 17a being connected via ducts 19 and 20 to the lines 13 and 14 respectively. The chambers 16b and 17b are both open to electroviscous fluid 21 contained in a sealed pilot circuit 22.

Two free non-return valves 23 and 24 comprising the one-way flow means of the pilot circuit, also form part of the pumping means 10 and are located in the pilot circuit 22, one at each side of the chamber 17b.

In operation, the action of the oscillator 11 powered by primary fluid flow in the line 9, causes the fluid pressure within the chambers 16a and 17a to rise and fall in antiphase at a frequency linearly dependent upon the primary fluid flow rate in the line 9. These pressure pulsations are superimposed, via the diaphragm 18, upon the electroviscous fluid in the chambers 16b and 17b respectively, where they operate in conjunction with the non-return valves 23 and 24, to circulate the electroviscous fluid in the pilot circuit 22. The flow rate generated in the pilot circuit 22 is thus dependent upon the operation of the oscillator 11, which in turn depends upon the primary fluid flow rate in the line 9. The flow rate in the line 9 may be selected by means of an optional restrictor valve 32 in the line 15, to enable a constant flow rate to be set up in the pilot circuit 22, whatever the pressure may be of the specific primary fluid supply to which the servo-valve is to be applied.

The remaining components of the pilot circuit 22 include four electroviscous valves 25, 26, 27, 28 disposed in a conventional "Wheatstone Bridge" arrangement, and a pressure transmitting means comprising two chambers 29 and 30 located respectively between the valves 25 and 26 and the valves 27 and 28. The chambers 29 and 30 are each closed with a flexible diaphragm 31 sealed respectively to the end faces 3 and 4 of the spool 2.

Electrical connections (not shown) are provided to each of the four valves 25 to 28, by means of which variable voltages can be applied to modify the rate of flow of electroviscous fluid through each valve so as to vary differentially the electroviscous fluid pressures within the two chambers 29 and 30, thereby to actuate the spool 2 to switch the inlet line 6 from one to the other of the outlet lines 7 and 8.

It will be apparent to those skilled in the art that various alternative arrangements of a servo valve in accordance with the present invention are possible. For example, pumping pulses for circulating the electroviscous fluid within the sealed pilot circuit could be derived from a hydraulic motor running in a primary fluid flow, but although this arrangement would provide a higher pumping efficiency than a fluidic oscillator, it would suffer from the disadvantage that contamination in the primary fluid could cause the hydraulic motor to jam. Further, various arrangements of electroviscous valves may be used in the pilot circuit to operate the control valve, and the one-way flow means of the pilot circuit may comprise fluidic valves or electroviscous valves operating in synchronism with the pumping pulses.

The completely sealed electroviscous pilot circuit of the present invention has the attendant advantage that the servo valve may be pre-assembled in a clean atmosphere and can also be embedded in a solid medium, if further protection is desired, as at no point is the system open to atmosphere. Furthermore, electroviscous valves do not demand the close dimensional tolerances of conventional hydraulic valves and, because the electroviscous fluid flow rate in the pilot circuit is effectively independent of the primary fluid supply pressure, single-size electroviscous valves may be used to serve over a wide range of applications.

I claim:

1. A hydraulic servo valve having an adjustable control valve means for controlling the flow of a pressurized primary fluid from a source thereof comprising:
    a sealed pilot circuit of electroviscous fluid having pressure transmitting means for transmitting the pressure of said electroviscous fluid thereby responsively adjusting said control valve, and electrically controlled valve means for varying the electroviscous fluid pressure at said transmitting means; and
    a pumping means driveable by the primary fluid for circulating the electroviscious fluid within said sealed pilot circuit including:
    a fluidic oscillator operatively connected to said primary fluid source for alternately directing a portion of said primary fluid to flow through two outlet flow lines;
    first and second coupling means operatively associated with each of said two outlet flow lines for communicating fluid pressure of the primary fluid flowing in each of said two outlet flow lines to the electroviscous fluid in said pilot circuit; and
    one-way flow means located in said pilot circuit intermediate said first and second coupling means for only allowing unidirectional flow of electroviscous fluid through said pilot circuit.

2. A servo valve as claimed in claim 1 wherein said electrically controlled valve means comprises four electroviscous valves disposed as series pairs in two parallel flow paths of the pilot circuit and said pressure transmitting means comprises two flexible-walled chambers respectively located intermediate each series pair.

3. A servo valve as claimed in claim 2 wherein said control valve comprises a spool valve, having a spool disposed so as to have two opposing end faces in contact with said two flexible-walled chambers respectively.

4. A hydraulic servo valve comprising:
    a reciprocable spool valve having a spool with two opposed end faces, an inlet port adapted for connection to a pressurized primary fluid supply, and two outlet ports, either one of which can be disposed in fluid communication with the inlet port by reciprocal movement of the spool;
    a fluidic oscillator having an inlet line connected to said primary fluid supply and twin outlet lines between which the fluid flow is directed to oscillate; and
    a closed pilot circuit of electroviscous fluid including, in series connection:
        two pumping stations each having a sealed flexible diaphragm located interjacent the electroviscous fluid and the primary fluid flowing in a respective one of said twin outlet lines of the fluid oscillator;
        a one-way flow valve located intermediate each pumping station,
        two series pairs of electroviscous valves disposed in parallel intermediate one of said pumping stations and one of said one-way flow valves, and
        a pressure transmitting chamber disposed intermediate the two electroviscous valves of each series pair, each chamber having a sealed flexible diaphragm interjacent the electroviscous fluid and a respective one of said two opposed end faces of the spool,
    whereby reciprocal variation of the pressures within the two transmitting chambers by a predetermined adjustment of the electroviscous valves reciprocates the spool so as to switch the inlet port from one of the other of the two outlet ports.

5. In a hydraulic servo valve of the type including a spool valve having an inlet port and two outlet ports, and reciprocable spool means for changing the path of flow of a primary fluid from a source thereof between a first position whereby said inlet port and one of said outlet ports are in fluid communication and a second position whereby said inlet port and the other of said outlet ports are in fluid communication; at least one electroviscous pilot circuit including first and second pairs of electroviscous valves in parallel arrangement and first and second sealed chamber means each operatively associated with one end of said spool means and disposed between each of said first and second pairs of said electroviscous valves for transmitting the pressure of said electroviscous fluid to said spool means thereby responsively and reciprocally moving said spool means between said first and second positions, wherein the improvement comprises:

pumping means for circulating the electroviscous fluid in said pilot circuit, said pumping means comprising:

fluid oscillator means including means connecting said fluid oscillator means to said primary fluid source, and having an inlet line and two outlet lines for directing primary fluid to alternately flow between said inlet line and one or the other of said outlet flow lines.

first and second pumping means located on each of said outlet lines for communicating pressure of said primary fluid flowing in each of said outlet lines to said electroviscous fluid in said pilot circuit; and unidirectional flow means located in said pilot circuit intermediate said first and second pumping means for permitting flow of electroviscous fluid in only one direction in said pilot circuit by virtue of the primary fluid operatively associated with said pumping means.

* * * * *